United States Patent
Hjortstam et al.

(10) Patent No.: US 6,609,857 B1
(45) Date of Patent: Aug. 26, 2003

(54) METHOD AND DEVICE FOR MIXING A FLOWING GAS AND A PULVERULENT MATERIAL

(75) Inventors: Magnus Hjortstam, Åryd (SE); Lars-Erik Johansson, Älmeboda (SE)

(73) Assignee: ABB Fläkt Aktiebolag, Stockholm (SE)

(*) Notice: Subject to any disclaimer, the term of this patent is extended or adjusted under 35 U.S.C. 154(b) by 0 days.

(21) Appl. No.: 09/868,676

(22) PCT Filed: Dec. 15, 1999

(86) PCT No.: PCT/SE99/02359
§ 371 (c)(1),
(2), (4) Date: Aug. 7, 2001

(87) PCT Pub. No.: WO00/38822
PCT Pub. Date: Jul. 6, 2000

(30) Foreign Application Priority Data

Dec. 23, 1998 (SE) ............................................... 9804552

(51) Int. Cl.$^7$ ............................................... B65G 53/00
(52) U.S. Cl. ........................ 406/197; 406/198; 406/92; 406/93; 406/191
(58) Field of Search ............................ 406/92, 93, 191, 406/194, 197, 198; 110/309; 34/360

(56) References Cited

U.S. PATENT DOCUMENTS

| | | | |
|---|---|---|---|
| 1,031,289 A | * 7/1912 | Pedley | 417/172 |
| 3,834,860 A | * 9/1974 | Fukuda et al. | 432/58 |
| 4,215,956 A | * 8/1980 | Reba | 406/152 |
| 4,230,426 A | * 10/1980 | Avery et al. | 406/191 |
| 4,265,573 A | * 5/1981 | Reba | 406/152 |
| 4,279,622 A | * 7/1981 | Jones et al. | 48/197 R |
| 4,569,819 A | * 2/1986 | David | 376/273 |
| 5,588,787 A | * 12/1996 | Manjunath et al. | 406/85 |
| 5,658,544 A | 8/1997 | Goodes et al. | |
| 6,155,751 A | * 12/2000 | Lane et al. | 406/61 |

FOREIGN PATENT DOCUMENTS

| | | |
|---|---|---|
| DE | 298 07 889 U1 | 5/1995 |
| DE | 43 40 908 A1 | 9/1998 |
| EP | 0 200 695 A1 | 5/1986 |
| WO | WO 97/43030 A2 | 11/1997 |

\* cited by examiner

*Primary Examiner*—Joseph A. Dillon
(74) *Attorney, Agent, or Firm*—Burns, Doane, Swecker & Mathis, L.L.P.

(57) ABSTRACT

A method for mixing a pulverulent material in a main gas flow with a view to achieving uniform distribution of the pulverulent material. The turbulence in the main gas flow is increased in a vortex-generating zone. The pulverulent material is introduced into the main gas flow, in a mixing zone, with a carrier gas flow whose net motion during introduction is essentially opposite to the main gas flow. The mixing zone is positioned downstream of the vortex-generating zone and in the vicinity thereof. The carrier gas flow with the pulverulent material is in a rotational zone given a helical motion, whose axis of symmetry is essentially parallel with the direction of flow of the main gas flow, and is introduced into the mixing zone in the form of a divergent hollow cone. A device for carrying out the method comprises a gas duct (1) for the main gas flow with vortex-generating means (4) and an introducing means (11) for introduction of pulverulent material in dispersed state into a carrier gas flow. The introducing means (11) comprises a cylindrical pipe (13) with an open and a closed end, a tangential inlet (17) in the vicinity of the closed end of the cylindrical pipe (13), and a divergent axial outlet (18) at the open end of the cylindrical pipe comprising a truncated conical jacket (14) and a centered insert (16) adjacent to the axial outlet so adapted that an annular opening (19) forms between the truncated conical jacket (14) and the insert (16).

13 Claims, 2 Drawing Sheets

METHOD AND DEVICE FOR MIXING A FLOWING GAS AND A PULVERULENT MATERIAL

FIELD OF THE INVENTION

The present invention relates to a method for mixing a pulverulent material in a main gas flow with a view to achieving uniform distribution of the pulverulent material.

The present invention also relates to a device for carrying out the method, comprising a gas duct for the main gas flow with vortex-generating means and an introducing means for introducing pulverulent material in dispersed state with a carrier gas flow.

The invention is especially intended for use in gas cleaning with a view to separating gaseous pollutants. The pulverulent material is selected so that it can absorb or adsorb undesirable gas components.

BACKGROUND ART

In gas cleaning, there are frequently two completely different tasks. On the one hand, particles are to be removed from a gas flow and, on the other hand, certain gas components are to be removed. Relatively simple techniques of separating particles are well established since the beginning of the century, but separating gas components is a considerably more complicated operation.

In situations where the gas flow is small and not heavily polluted, for instance fractionated condensation or a membrane technique can be used, but in technical contexts, it is often necessary to choose a roundabout method so as to bind any existing gaseous pollutants to particles, powder or droplets, and then separate the particles.

When introducing absorbing or adsorbing particles, the accessible surface thereof and the mixing in the gas flow are of great importance. It is thus a matter of introducing as finely divided particles as possible and distributing these as uniformly as possible. Moreover, a high relative speed between particles and gas is desirable. The turbulence, in a wide sense, should thus be high. By turbulence is here and below meant every motion in the gas that deviates from the average motion of the flow, thus also macroscopic vortices etc.

To achieve this mixing effect, particles are frequently introduced at a velocity which significantly deviates from the velocity of the gas. In a scrubber, fine droplets are injected at high velocity in a slowly flowing gas. In a venturi, gas flows at high velocity through curtains of liquid or a mist of liquid. This utilisation of differences in velocity is not possible to the same extent when a dry sorbent is introduced. In such situations, the homogenous distribution in the gas will be particularly important.

An example of such a technique is disclosed in EP-200 695, where moistened gas is conducted upwards through a vortex-generating device past an introducing means through which a pulverulent absorbent is introduced into the flowing gas in a direction of motion essentially opposite to the main flow direction of the gas. However, the publication does not provide any information about a suitable design of the introducing means.

OBJECT OF THE INVENTION

An object of the invention is provide a method and a device for good contact between a pulverulent material and a flowing gas by effecting a distribution, which is as uniform as possible, of the powder in the gas flow and at the same time achieving a high relative motion between particles and gas.

SUMMARY OF THE INVENTION

The present invention relates to a method for mixing a pulverulent material in a main gas flow with a view to achieving uniform distribution of the pulverulent material. The turbulence in the main gas flow is increased in a vortex-generating zone. The pulverulent material is introduced into the main gas flow, in a mixing zone, with a carrier gas flow whose net motion during introduction is essentially opposite to the main gas flow. The mixing zone is positioned downstream of the vortex-generating zone and in the vicinity thereof. The zones can be slightly overlapping.

In the method according to the invention, the carrier gas flow with the pulverulent material is given, in a rotational zone, a helical motion, whose symmetry axis is essentially parallel with the direction of flow of the main gas flow. The carrier gas flow with the pulverulent material is introduced into the mixing zone in the form of a divergent hollow cone.

The present invention also relates to a device for carrying out the method, comprising a gas duct for the main gas flow with vortex-generating means and an introducing means for introducing pulverulent material in dispersed state with a carrier gas flow.

The introducing means comprises a cylindrical pipe with an open end and a closed end, a tangential inlet in the vicinity of the closed end of the cylindrical pipe, a divergent axial outlet at the open end of the cylindrical pipe and an insert adjacent to the axial outlet. The divergent axial outlet, comprises a truncated conical jacket, and a centred insert adjacent to the axial outlet is so adapted that an annular opening forms between the truncated conical jacket and the insert.

GENERAL DESCRIPTION OF THE INVENTION

With a view to establishing a good contact between a pulverulent material and a gas when introducing the pulverulent material into a gas flow, a uniform distribution of the pulverulent material in the gas flow is most essential. Therefore, it is suggested according to the present invention that the pulverulent material be dispersed in a carrier gas, the flow of which is essentially smaller than the main flow, for instance 1–10%, preferably 1–5%, of the gas to be cleaned. The carrier gas flow with dispersed pulverulent material, below referred to as carrier gas flow only, is passed at a velocity of 10–25 m/s through an inlet, comprising a slot-shaped opening, tangentially, into a rotational zone consisting of a cylindrical pipe. The carrier gas flow is given a helical motion in the rotational zone, preferably with a constant diameter, in a first part of the rotational zone, and with an increasing diameter, in a second part of the rotational zone.

The slot is positioned at one end of the cylindrical pipe and is oriented in such a manner that its longest extent is parallel with the axis of symmetry of the cylindrical pipe. The extent, in the radial direction, of the projection of the inlet is significantly smaller. The area of the slot is 0.1–0.4 times the cross-sectional area of the cylindrical pipe, preferably 0.2–0.3 times the cross-sectional area of the cylindrical pipe. The ratio of the length of the slot to the length of the cylindrical pipe should be 0.1–0.6, preferably 0.3–0.5.

The shape of the slot is of decisive importance to the invention owing to the fact that a considerably more uniform distribution, seen as a function of an angular coordinate round the outlet, of the pulverulent material is achieved. Prior-art devices have a marked asymmetry round the outlet of the introducing device.

The carrier gas flow is passed to the inlet through a duct which gradually passes from a circular or square cross-section to said slot shape. The velocity of the carrier gas is then kept constant or is slightly increased.

The carrier gas flow is adjusted to the need for pulverulent material that exists so that a diluted transport can be carried out with up to 2 kg of powder, preferably 0.1–1.5 kg of powder, per cubic meter of carrier gas.

The length of the cylindrical pipe is 1 to 5 times, preferably 2 to 5 times, its diameter. The cylindrical pipe is closed at one end, adjacent to the slot-shaped opening, preferably with a bottom comprising a conical part or the like, the top being directed inwards. At the other end, the pipe changes to the form of a truncated cone jacket diverging away from the pipe.

The conical part should have a height which is 0.2–0.6 times the diameter of the cylindrical pipe and a diameter which is 0.6–1.0 times the diameter of the cylindrical pipe. The shape of this bottom part can be slightly modified without significantly impairing the function, but should have a central elevation, such as a tip.

The truncated conical jacket should have a length which is 0.5–3.0 times the diameter of the cylindrical pipe and a maximum diameter which is 1.4–4.0 times the diameter of the cylindrical pipe.

To obtain a carrier gas flow in the form of a hollow cone, an insert is arranged in the outlet of the pipe or in the truncated cone jacket, so that between this insert and the truncated conical jacket an annular opening forms. The cross-sectional area of this annular opening is adjusted to the cross-sectional area of the cylindrical pipe so that the ratio thereof will be 0.5–1.5, preferably 0.8–1.2, especially 0.9–1.1. Here preferably a conical insert or the like is selected, the top being directed towards the carrier gas flow.

A vortex generator is arranged upstream of the introducing means in the gas duct for the main gas flow. The vortex generator is designed so that pairs of opposed vortex trails form while preventing global rotation of the main gas flow. Such a vortex generator can be of the type as described in EP-185 632, comprising triangular plates each having a corner at the wall of the gas duct and the other corners joined with neighbouring other plates so that an opening forms between them in the form of an essentially regular polygon whose sides consist of one side of each triangle.

The vortex generator is arranged immediately upstream of the outlet of the introducing means, including the truncated conical jacket extension. The distance between them should not exceed the diameter of the cylindrical pipe, preferably be smaller than one fifth of the diameter of the cylindrical pipe. It may also be convenient for the outlet of the introducing means to slightly penetrate into the vortex-generating zone. This outlet is adjusted so that, with a centred position, it covers the major part of said polygon without essentially projecting beyond the same. The area of the outlet should exceed 50%, preferably 70% of the area of the polygon. The diameter of the outlet should also be adjusted to the diameter, or lateral length, of the main gas duct, so that the ratio is between 0.3 and 0.6.

BRIEF DESCRIPTION OF THE DRAWINGS

The invention will now be described in more detail with reference to the accompanying drawings, in which.

DESCRIPTION OF A PREFERRED EMBODIMENT

The invention will now be described in more detail with reference to the accompanying Figures.

Figure 1:
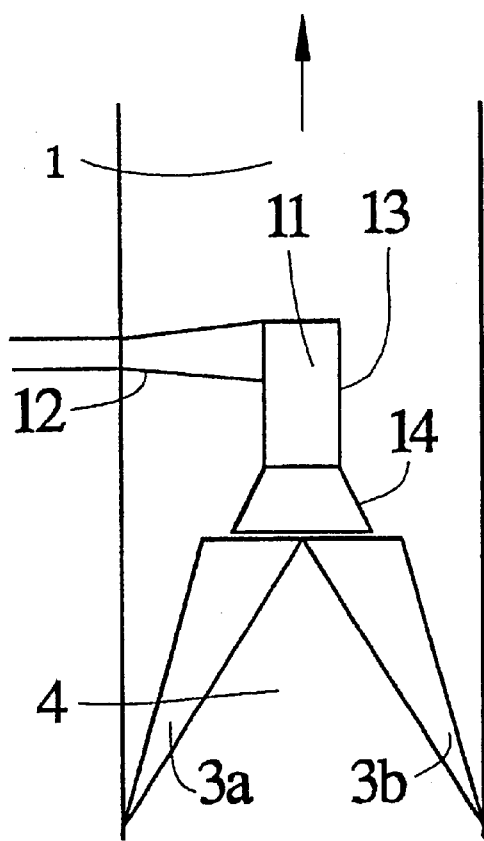
FIG. 1 is a horizontal view of an embodiment according to the invention.
Figure 2:
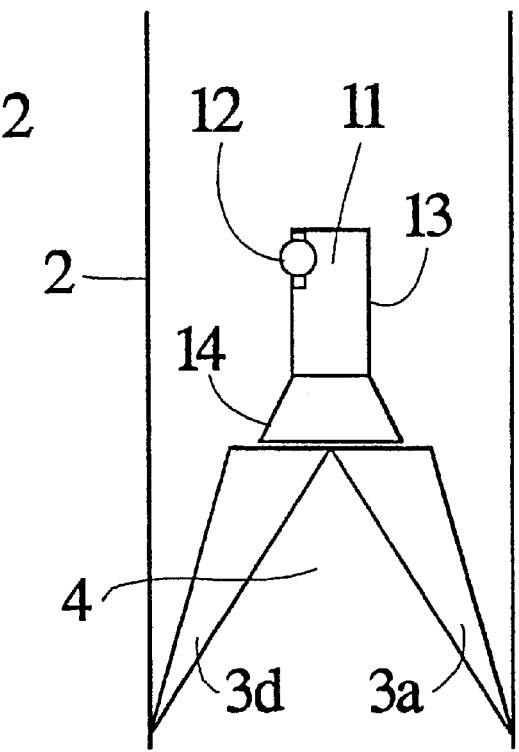
FIG. 2 is a second horizontal view of the same embodiment, perpendicular to the one in FIG. 1.
Figure 3:
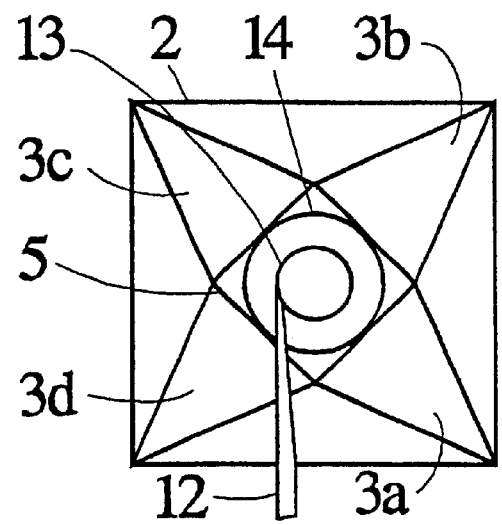
FIG. 3 is a vertical view of the same embodiment.

FIGS. 1–3 are different views of a square main gas duct 1 with four walls 2. The side of the square is 1 m. The duct contains a vortex generator 4 consisting of four isosceles triangular plates 3a, 3b, 3c, 3d with their tops connected to the walls 2 of the duct 1 in the corners between the same. The triangular plates 3a–3d are at their bases interconnected, so that a square 5 forms between them, twisted in relation to the main gas duct 1, with the bases of the triangles as sides. The sides of the twisted square are about 0.4 m. An introducing means 11 is arranged above the vortex generator 4. The introducing means comprises a circular cylindrical pipe 13 with a truncated conical jacket 14 as an end portion and an inlet duct 12. The inlet duct is circular in cross-section outside the main gas duct 1 and is formed as a rectangular slot in the connection to the cylindrical pipe 13. The introducing means 11 is centred relative to the main gas duct 1. The truncated conical jacket 14 has a circular outlet which, projected in the longitudinal direction of the duct 1, forms a circle inscribed in the twisted square 5 between the triangular plates 3a–3d.

Figure 4:
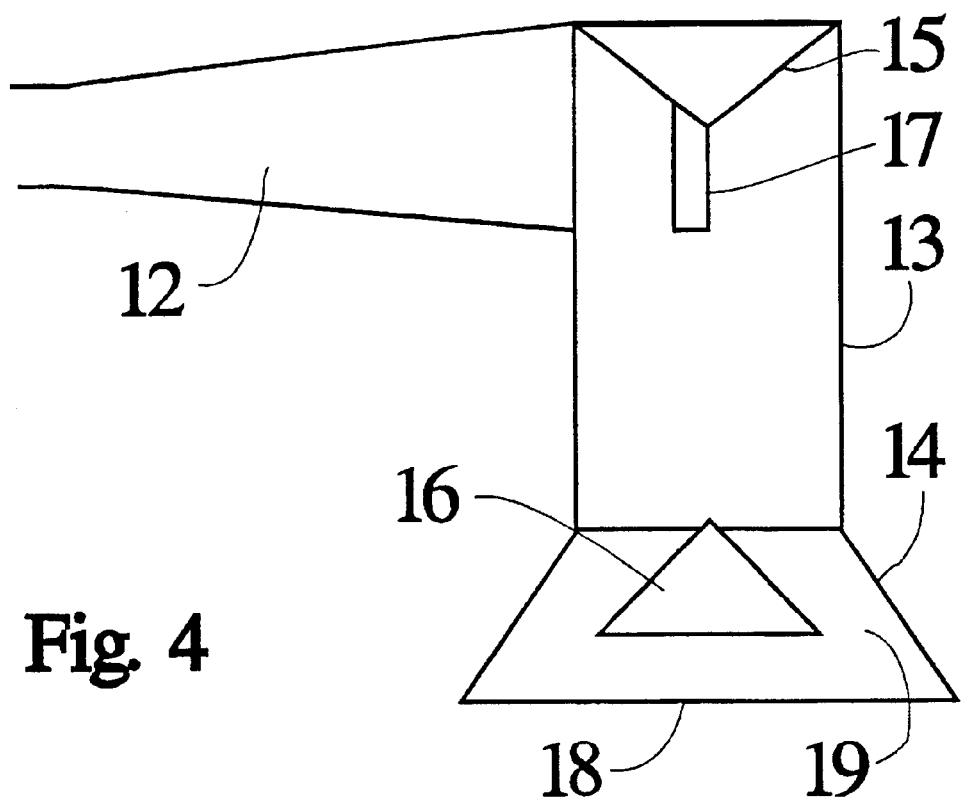
FIG. 4 is a vertical section of a suggested introducing means.
Figure 5:
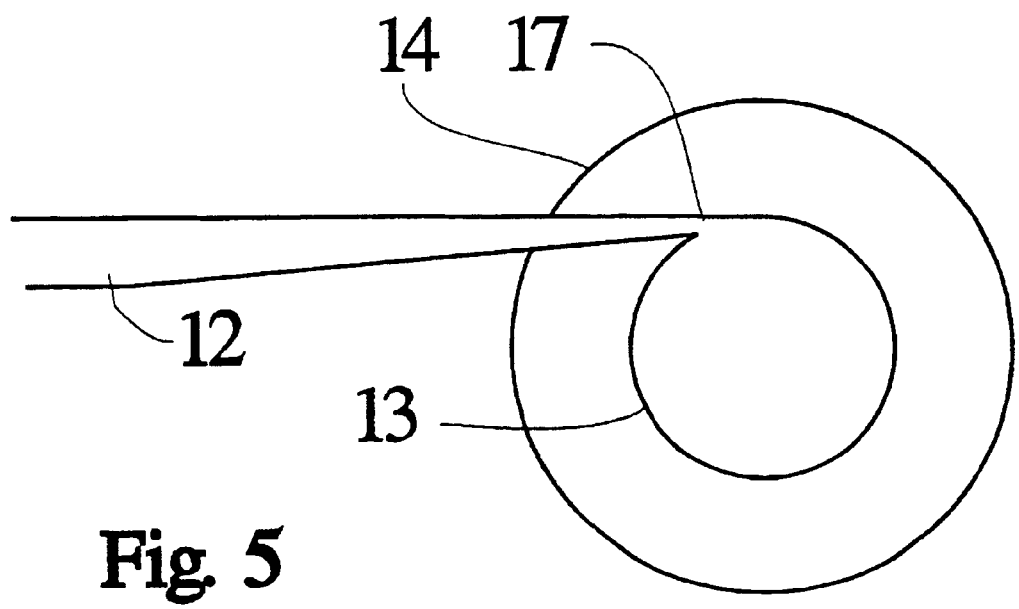
FIG. 5 is a horizontal section of the same introducing means.

FIGS. 4 and 5 illustrate in detail an introducing means 11 according to the invention. The inlet duct 12 leads with a rectangular slot 17 to the cylindrical pipe 13 at the upper end thereof. The cylindrical pipe 13 is closed at its upper end, adjacent to the rectangular slot 17, with a conical bottom 15. At the lower end, the circular cylindrical pipe 13 passes into a diverging truncated conical jacket 14, whose lower end is open and constitutes the outlet 18 of the introducing means 11. A conical insert 16 is centrally mounted in the truncated conical jacket 14. Between the truncated conical jacket 14 and the conical insert 16 an annular opening 19 is formed.

In the method according to the invention, a main gas flow flows vertically upwards through the duct 1. When passing the vortex generator 4, pairs of vortex trails of opposed vortices form round the edges of the triangular plates 3a–3d, and the gas reaches the introducing means 11 under severe turbulence.

A carrier gas with powder is blown through the inlet duct 12 and the rectangular slot 17 into the cylindrical pipe 13. Under fast rotation, the carrier gas flows down through the cylindrical pipe 13 and through the annular opening 19 between the conical insert 16 and the truncated conical jacket 14 to the outlet 18, whereupon it is mixed with the main gas flow adjacent to or immediately downstream of the vortex generator 4.

What is claimed is:

1. A method for mixing a pulverulent material in a main gas flow comprising:

increasing turbulence in the main gas flow;

introducing the pulverulent material into the main gas flow with a carrier gas flow, the carrier gas flow having a net motion during introduction of the pulverulent material that is essentially opposite to a direction of flow of the main gas flow, wherein the carrier gas flow with the pulverulent material moves in a helical motion and has an axis of symmetry essentially parallel with the direction of flow of the main gas flow, and the carrier gas flow with the pulverulent material is introduced into the main gas flow in the form of a divergent hollow cone.

2. A method as claimed in claim 1, wherein the carrier gas flow with the pulverulent material is introduced tangentially into the main gas flow such that a length of the carrier gas flow with the pulverulent material along the axis of symmetry exceeds a length of the carrier gas flow with the pulverulent material in a radial direction.

3. A method as claimed in claim 1, wherein the carrier gas flow with the pulverulent material is accelerated immediately before introduction into the main gas flow.

4. A method as claimed in claim 1, wherein the carrier gas flow with the pulverulent material at an initial point of introduction into the main gas flow defines a helix of a constant diameter and subsequently increases in diameter.

5. A method as claimed in claim 1, wherein the carrier gas flow is 0.01–0.10 times the main gas flow, the carrier gas flow contains 0.1–1.5 kg of pulverulent material per cubic meter of carrier gas, a velocity of the carrier gas flow where the carrier gas flow with the pulverulent material is 10–25 m/s, and the pulverulent material is adapted to perform at least one of absorption and adsorption with respect to undesirable gas components.

6. A method as claimed in claim 2, wherein the carrier gas flow with the pulverulent material is accelerated immediately before introduction into the main gas flow.

7. A method as claimed in claim 2, wherein the carrier gas flow with the pulverulent material at an initial point of introduction into the main gas flow defines a helix of a constant diameter and subsequently increases in diameter.

8. A method as claimed in claim 3, wherein the carrier gas flow with the pulverulent material at an initial point of introduction into the main gas flow defines a helix of a constant diameter and subsequently increases in diameter.

9. A method as claimed in claim 2, wherein the carrier gas flow is 0.01–0.10 times the main gas flow, the carrier gas flow contains 0.1–1.5 kg of pulverulent material per cubic meter of carrier gas, a velocity of the carrier gas flow where the carrier gas flow with the pulverulent material is 10–25 m/s, and the pulverulent material is adapted to perform at least one of absorption and adsorption with respect to undesirable gas components.

10. A method as claimed in claim 3, wherein the carrier gas flow is 0.01–0.10 times the main gas flow, the carrier gas flow contains 0.1–1.5 kg of pulverulent material per cubic meter of carrier gas, a velocity of the carrier gas flow where the carrier gas flow with the pulverulent material is 10–25 m/s, and the pulverulent material is adapted to perform at least one of absorption and adsorption with respect to undesirable gas components.

11. A method as claimed in claim 4, wherein the carrier gas flow is 0.01–0.10 times the main gas flow, the carrier gas flow contains 0.1–1.5 kg of pulverulent material per cubic meter of carrier gas, a velocity of the carrier gas flow where the carrier gas flow with the pulverulent material is 10–25 m/s, and the pulverulent material is adapted to perform at least one of absorption and adsorption with respect to undesirable gas components.

12. A method as claimed in claim 1, wherein the carrier gas flow is 0.01–0.05 times the main gas flow, the carrier gas flow contains 0.1–1.5 kg of pulverulent material per cubic meter of carrier gas, a velocity of the carrier gas flow where the carrier gas flow with the pulverulent material is 10–25 m/s, and the pulverulent material is adapted to perform at least one of absorption and adsorption with respect to undesirable gas components.

13. A method as claimed in claim 1, wherein turbulence is increased in the main gas flow by generating a vortex in the main gas flow.

* * * * *